June 6, 1950 M. L. WORMINGTON 2,510,920

TELEPHONE DIAL OPERATING DEVICE

Filed April 7, 1947

INVENTOR,
Mabel Wormington.
BY
Roy E. Hamilton,
Attorney.

Patented June 6, 1950

2,510,920

UNITED STATES PATENT OFFICE 2,510,920

TELEPHONE DIAL OPERATING DEVICE

Mabel L. Wormington, Kansas City, Mo.

Application April 7, 1947, Serial No. 739,818

1 Claim. (Cl. 179—90)

This invention relates to improvements in a device for operating telephone dials, and has particular reference to a simple device for engaging the finger holes of a telephone dial and rotating the dial to secure a connection.

The principal object of the present invention is the provision of a rod or stick suitable for operating a telephone dial, said rod being attached to the telephone by means of an elastic member to permit free manipulation thereof.

Other objects are simplicity and economy of construction, convenience of use, and adaptability to be attached to virtually any type of telephone instrument.

With these objects in view, as well as further objects which will appear during the course of the specification, reference will now be had to the drawing, wherein.

Figure 1:
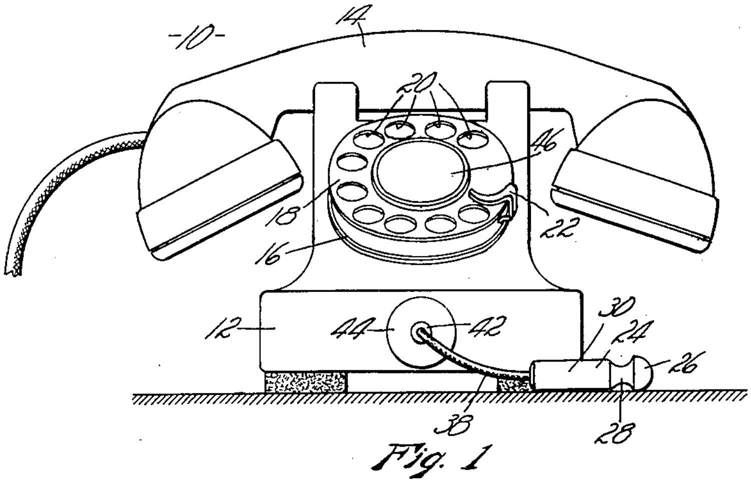
Figure 1 is a front elevation of one type of telephone instrument showing a dial operating device embodying the present invention attached thereto.

Like reference characters apply to similar parts throughout the several views, and the numeral 10 applies to a telephone instrument having a base 12, a handset 14 normally cradled in said base, a fixed dial member 16 carried by said base, a movable dial member 18 oscillatably carried by said base, and having finger holes 20 formed therethrough, and a finger stop 22 fixed relative to base 12 and extending above the movable dial member.

The dial operating device comprises a cylindrical rod 24 having a substantially hemispherical tip 26 of somewhat larger diameter than finger holes 20. Rod 24 has a reduced neck portion 28 immediately behind tip 26, said neck serving primarily to permit better visibility past tip 26 during use, and also as a finger grip. The remainder of rod 24 serves as a handle 30 on the cylindrical surface of which may be imprinted suitable advertising indicia 32 if desired.

Rod 24 is provided with an axial bore 34 extending therethrough, said bore having an enlarged portion 36 at its forward end within hemispherical tip 26.

An elastic cord 38 of smaller diameter than bore 34 extends through said bore and is retained therein by means of a knot formed in said cord within enlarged portion 36, said knot being too large to pass through the bore. After the cord has been positioned as described, the forward end of enlarged portion 36 is filled with a tightly fitting plug 40. The end of cord 38 could also be molded solidly into tip 26. The end of cord 38 extending from the rearward end of rod 24 is knotted and solidly molded in a boss 42 formed on the back of an ordinary vacuum cup 44 made of rubber or other resilient material. Cup 44 is adapted to be affixed by pressure to any flat, smooth surface, and is shown in Figure 1 attached to the base 12 of telephone 10. It could be attached with equal facility to other parts of the phone, for example to the center portion 46 of movable dial member 18, or to any surface conveniently near the telephone.

Figure 2:
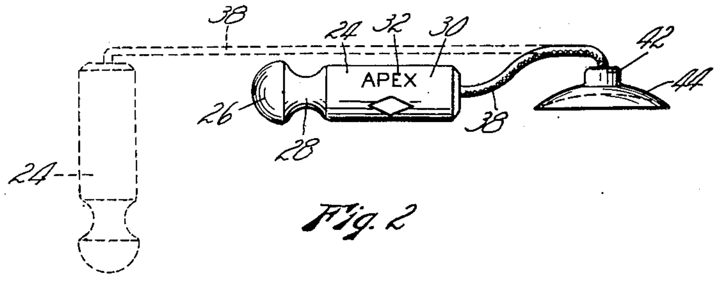
Fig. 2 is an enlarged side view of the dial operating device detached from a telephone, with the operating rod shown in its normal position in solid lines, and extended for use in dotted lines.
Figure 3:
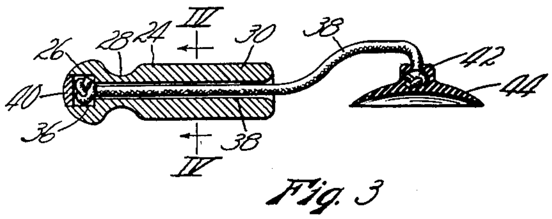
Fig. 3 is a central longitudinal section through the device.
Figure 4:
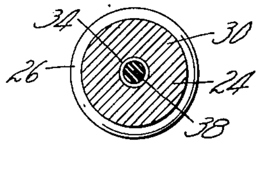
Fig. 4 is an enlarged section taken on line IV—IV of Figure 3.

To use the dial operating device, the operator grasps handle 30 or rod 24, and extends cord 38 elastically as shown in dotted lines in Figure 2 to bring rod 24 into proper position to operate dial member 18. Since cord 38 is anchored at the forward end of rod 24, the elasticity of the cord included within the rod is utilized, and hence permits a shorter reach of cord between the rod and cup 44. The hemispherical tip 26 of rod 24 is then inserted selectively in finger holes 20 and moved to rotate dial member 18 until rod 24 contacts finger stop 22, as in ordinary dialing using the fingers. The use of a hemispherical tip of larger diameter than the finger holes provides easy, guided insertion of the rod into the finger holes, and insures a snug but freely turning fit of the rod in the hole. The rod 24 may then be released and cord 28 will contract, holding the rod in convenient position for future use.

It is apparent that many minor changes could be made in the shape and structure of the rod, means of attaching the elastic cord, and other details of structure, without departing from the spirit of the invention, and it is, therefore, desired to be limited only by the scope of the appended claim.

What I claim as new, and desire to protect by Letters Patent, is:

A device for operating the dial of a telephone comprising a rod having a rounded tip adapted to be inserted selectively into the finger holes of said dial, said tip being of larger diameter than said finger holes, and means including an elastically extendable cord attaching said rod to said telephone, said cord extending freely through a longitudinal hole formed through said rod and being knotted within an enlargement of said hole formed within the rounded tip of said rod.

MABEL L. WORMINGTON.

REFERENCES CITED

The following references are of record in the file of this patent:

UNITED STATES PATENTS

| Number | Name | Date |
|---|---|---|
| 1,040,860 | Blaker | Oct. 8, 1912 |
| 1,069,468 | Rathburn | Aug. 5, 1913 |
| 1,158,251 | McDougall | Oct. 26, 1915 |
| 2,285,286 | Kirkman | June 2, 1942 |
| 2,320,608 | Jones | June 1, 1943 |
| 2,416,157 | Cotton | Feb. 18, 1947 |